L. RUBAY.
AUTOMOBILE VENTILATOR.
APPLICATION FILED APR. 9, 1915.
1,173,743.
Patented Feb. 29, 1916.
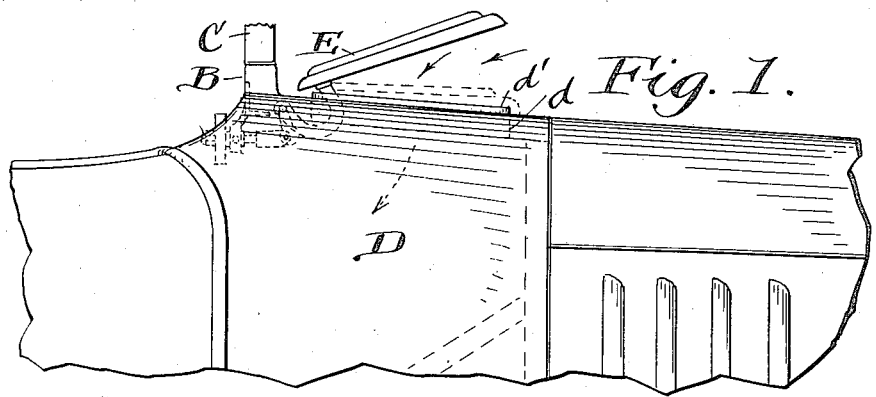
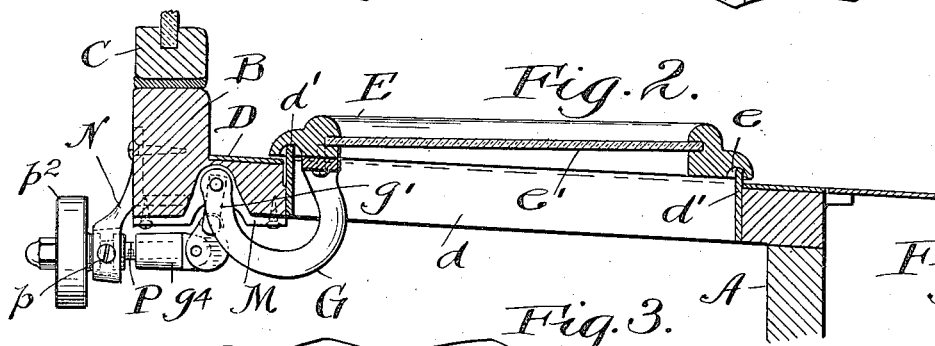
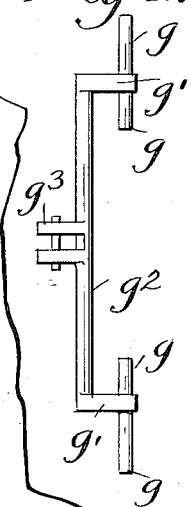
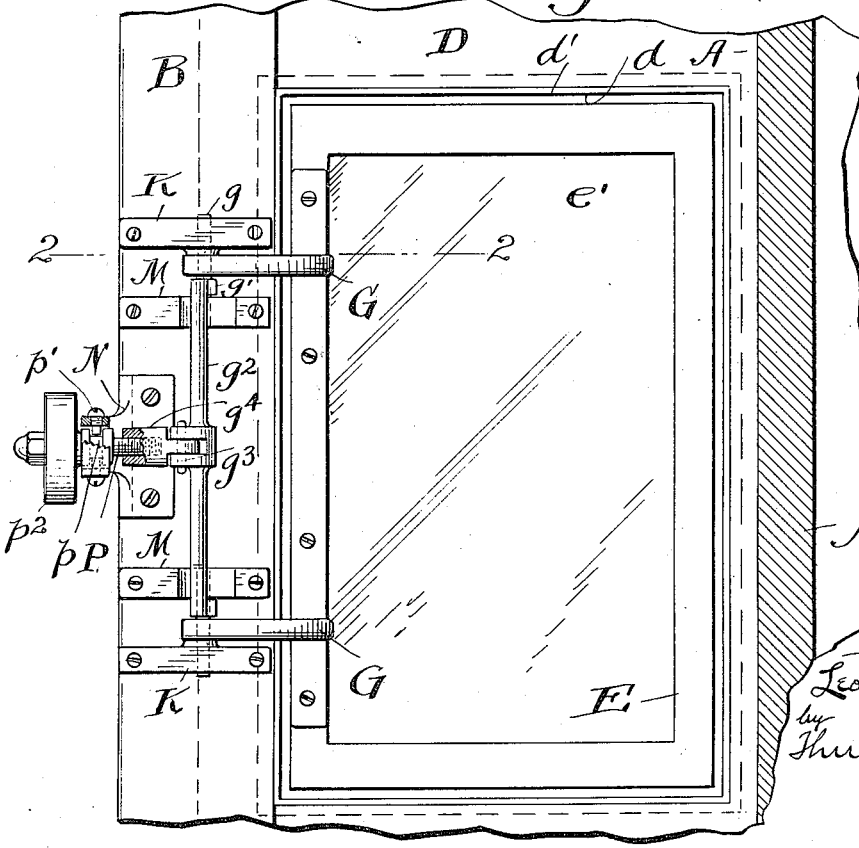
Inventor
Leon Rubay
by Thurston & Kwis
Attorneys

UNITED STATES PATENT OFFICE.

LEON RUBAY, OF CLEVELAND, OHIO, ASSIGNOR TO THE WHITE COMPANY, OF CLEVELAND, OHIO, A CORPORATION OF OHIO.

AUTOMOBILE-VENTILATOR.

1,173,743.  Specification of Letters Patent.  Patented Feb. 29, 1916.

Application filed April 9, 1915. Serial No. 20,141.

*To all whom it may concern:*

Be it known that I, LEON RUBAY, a citizen of the Republic of France, residing at Cleveland, in the county of Cuyahoga and State of Ohio, have invented a certain new and useful Improvement in Automobile-Ventilators, of which the following is a full, clear, and exact description.

The object of this invention is to ventilate the wholly or partly inclosed compartment between the driver's seat and the so-called dash of an automobile, and, more particularly to provide, for this compartment, an effective ventilating device which will be watertight when closed, but which may be opened and closed by a person sitting on the driver's seat.

The invention consists in the construction and combination of parts shown in the drawing and hereinafter described and pointed out definitely in the appended claims.

In the drawings, Figure 1 is a side elevation of that part of an automobile to which the present invention is applied; Fig. 2 is a central longitudinal vertical section through said part of an automobile; Fig. 3 is a bottom plan view of the invention, and Fig. 4 is a detached view of the rock shaft to which the ventilator plate is secured.

Referring to the parts by letters, A represents the so-called dash, which is a vertical transverse partition located between the driver's compartment and the space beneath the hood, wherein the motor and other parts are placed. D represents the so-called cowl. This is a part of the automobile body which is located behind the dash so as to overhang the front part of the driver's compartment. B represents a transversely extended bar which is a part of the body frame work. The rear edge of the cowl is secured to this cross bar. The above mentioned parts are commonly found in automobiles.

A hole $d$, which is preferably rectangular is formed through the top of the cowl. Around the margin of this hole is a flange $d'$ which projects slightly above the top surface of the cowl, and its function is to prevent water from flowing into this hole, unless it can flow over the top of this marginal flange. A ventilator shutter E is provided for covering this hole, which shutter has on its lower surface a groove $e$ adapted to take over said flange when the shutter is closed. Two curved hinge arms G are fixed to the under side of this shutter near the rear edge thereof; and they extend from their said points of connection downward under said cross bar B and then upward to the hinged brackets M, K, to which these curved arms are pivoted by means of alined trunnions $g, g$, which are rigidly connected with said arms. The brackets M, K, are let into recesses in the lower face of the cross bar B and are secured thereto. Integral with said trunnions $g, g$, and therefore rigidly connected with the curved hinged arms G are the two downwardly extended crank arms $g'$, which are connected together by a cross bar $g^2$ having ears $g^3$. A link $g^4$ is pivoted to said ears, and extends rearward therefrom.

A bracket N is fixed to and projects downward from the rear edge of the cross bar B. A shaft P is rotatably mounted in said bracket in such wise that it can not move endwise. Specifically it is formed with a circumferential groove $p$ into which a pin $p'$ projects, which pin is fixed to the bracket. The rear end of this shaft is threaded and screws into the end of the link $g^4$. An operating hand wheel $p^2$ is secured to the rear end of this shaft. It is obvious that one in the driver's compartment may, by turning this hand wheel in one direction or another, cause the hinge arms G to rock in one direction or the other, about the axis of their supporting trunnions, and thereby the ventilator shutter may be opened to substantially the position shown in Fig. 1, or closed as shown in Fig. 2.

Attention is called to the fact that the ventilator shutter as shown is formed of a metal frame in which a pane of glass $e'$ is set. This admits light to the space beneath the cowl which would otherwise be so dark that the driver could not see to read the various gages which are usually fixed to the dash beneath the cowl. For this reason one or more lights are placed beneath the cowl. But with the construction herein shown and described it is not necessary to use such lights during the daytime.

Having described my invention, I claim:

1. In an automobile, the combination with the cowl which overhangs the front part of the driver's compartment, and has a ventilating hole through it, a ventilator shutter adapted to cover said hole, U-shaped hinge arms which are fixed to said shutter adjacent to its rear edge and extend therefrom downward below the cowl and thence forward and upward,—their forward ends having pivotal connections with a part which is rigid with said cowl, and means operable from the driver's compartment for causing said hinge arms to swing about their pivotal axis.

2. In an automobile, the combination with the cowl which overhangs the front part of the driver's compartment and has a ventilating hole through it, an upstanding flange around said hole, a ventilator shutter adapted to cover said hole and having in its lower face a groove for engaging with said flange, U-shaped hinge arms which are fixed to said shutter adjacent to its rear edge and extend therefrom downward below said cowl and then forward and upward,—their forward ends having pivotal connections with a part which is rigid with said cowl, and means operable from the driver's compartment for causing said hinge arms to swing about their pivotal axis.

3. In an automobile, the combination with the cowl which overhangs the front part of the driver's compartment and has a ventilating hole through it, a transverse frame member which is secured to the under side of the rear edge of said cowl, a ventilator shutter adapted to cover said hole, U-shaped arms which are fixed to the said shutter adjacent to its rear edge and extend downwardly therefrom below said cowl and then forward and upward, bearing brackets fixed to said transverse frame member, the front ends of said hinge arms being pivoted to said brackets, and means operable from the driver's compartment simultaneously swinging said hinge arms about their said pivotal axis.

4. In an automobile, the combination with the cowl which overhangs the front part of the driver's compartment and has a ventilating hole through it, a transverse frame member which is secured to the under side of the rear edge of said cowl, a ventilator shutter adapted to cover said hole, U-shaped arms which are fixed to the said shutter adjacent to its rear edge and extend downwardly therefrom below said cowl and then forward and upward, laterally extended trunnions rigidly connected with said hinge arms, brackets fixed to said transverse frame member in what said trunnions are rotatably mounted, downwardly extended arms rigid with said trunnions, a cross bar connecting said downwardly extending arms, a rearwardly extended link pivoted to said cross bar, a bracket fixed to the transverse frame member, a shaft rotatably mounted therein, means preventing endwise movement of said shaft, a screw threaded connection between the front end of said shaft and said link, and a hand wheel on the rear end of said shaft.

In testimony whereof, I hereunto affix my signature in the presence of two witnesses.

LEON RUBAY.

Witnesses:
 A. J. HUDSON,
 C. V. SCHURGER.